(12) United States Patent
Nyshadham

(10) Patent No.: US 9,773,248 B2
(45) Date of Patent: Sep. 26, 2017

(54) TROUBLESHOOTING A PROBLEM WITH USER EQUIPMENT BASED ON A LOCATION OF A USER

(71) Applicant: Verizon Patent and Licensing Inc., Arlington, VA (US)

(72) Inventor: Shiva Rama Krishna Nyshadham, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 279 days.

(21) Appl. No.: 14/634,758

(22) Filed: Feb. 28, 2015

(65) Prior Publication Data

US 2016/0253676 A1    Sep. 1, 2016

(51) Int. Cl.
*G06Q 30/00* (2012.01)
*G01S 5/00* (2006.01)

(52) U.S. Cl.
CPC .......... *G06Q 30/016* (2013.01); *G01S 5/0027* (2013.01)

(58) Field of Classification Search
CPC ...... G06Q 30/016; G06Q 10/20; G01S 19/12; H04L 12/2816; H04L 12/2818; H04L 12/282; H04L 41/5064; H04L 41/5087; H04L 41/509; H04L 43/065
USPC .... 455/418, 419, 420, 422.1, 423, 424, 425, 455/404.2, 414.2, 456.1, 456.2, 456.3; 705/304, 305
See application file for complete search history.

(56) References Cited

U.S. PATENT DOCUMENTS

| 2007/0133780 A1* | 6/2007 | Berner | H04M 3/5166 |
| | | | 379/265.01 |
| 2014/0279571 A1* | 9/2014 | Cox | G06Q 10/20 |
| | | | 705/305 |

OTHER PUBLICATIONS

Wikipedia, "Technical Support," http://en.wikipedia.org/wiki/Technical_support, Aug. 27, 2014, 6 pages.

* cited by examiner

*Primary Examiner* — Thai Vu

(57) ABSTRACT

A device may be configured to receive a technical support request from a mobile device. The technical support request may request troubleshooting for a problem with user equipment. The device may receive location information from the mobile device indicating a mobile device location. The device may determine whether the mobile device is at a user equipment location based on the mobile device location. The device may select a troubleshooting routine based on whether the mobile device is at the user equipment location. The device may cause an agent device to execute the troubleshooting routine. The device may provide, to an agent device, the troubleshooting routine to cause the agent device to troubleshoot the user equipment using the troubleshooting routine.

20 Claims, 13 Drawing Sheets

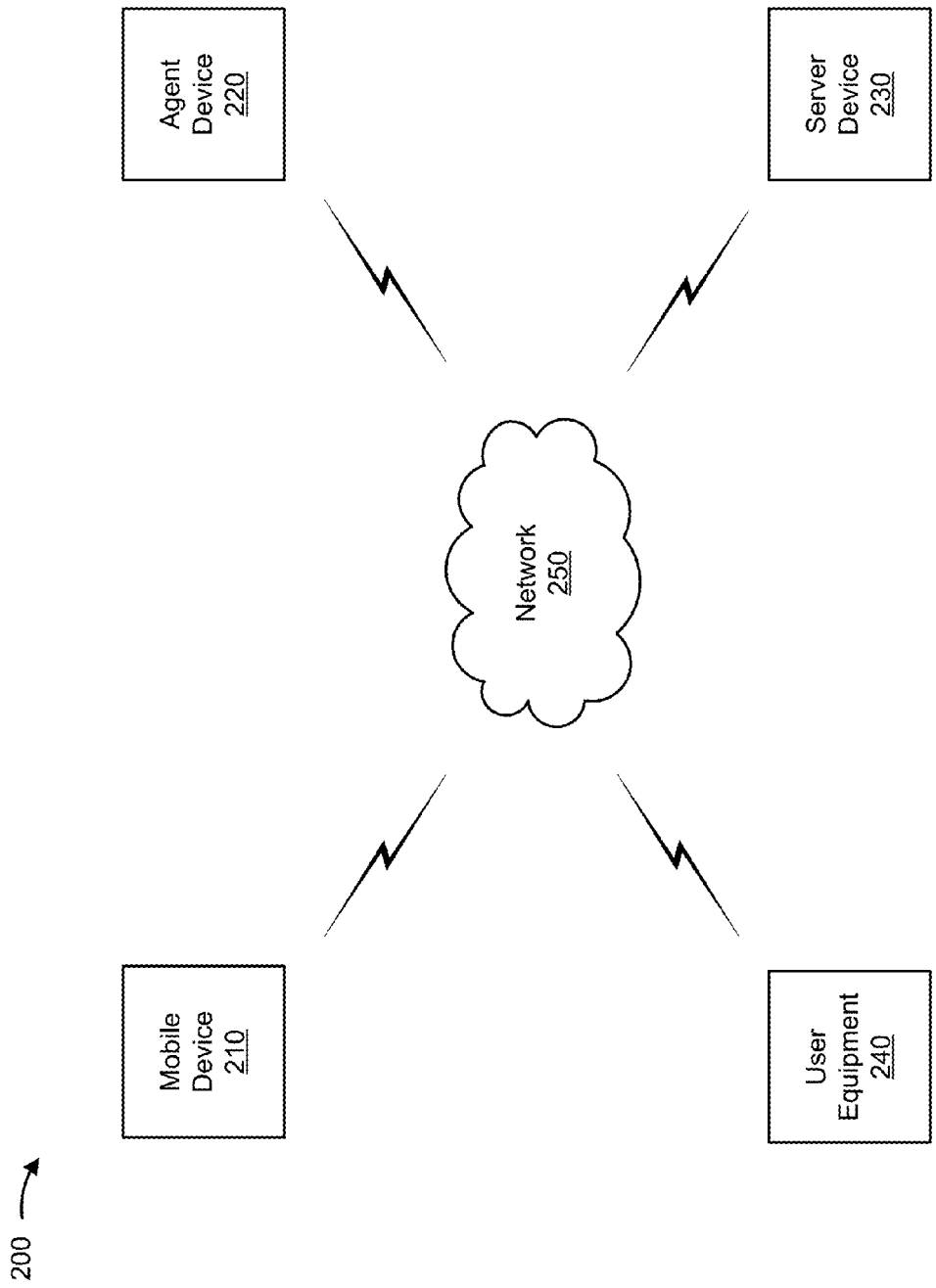

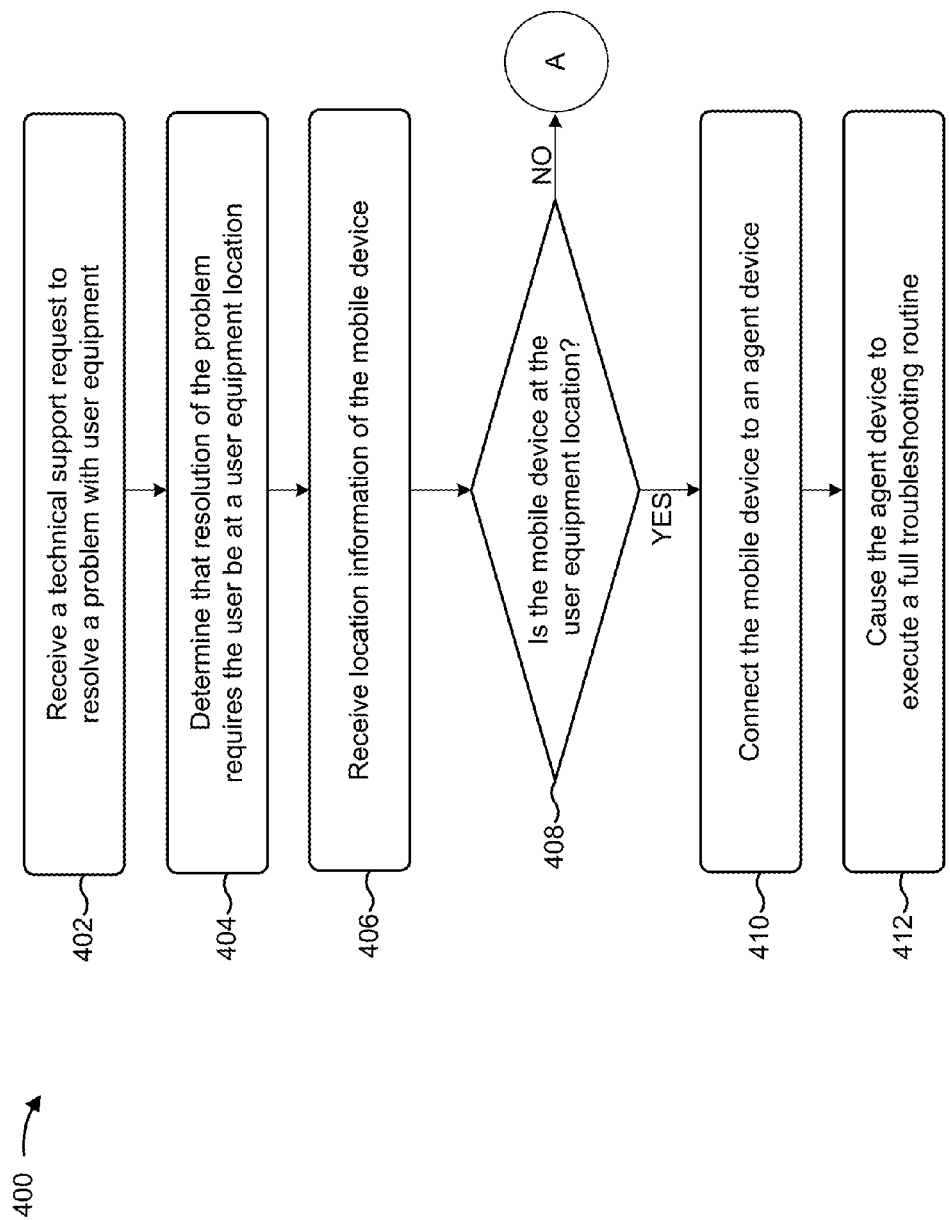

TROUBLESHOOTING A PROBLEM WITH USER EQUIPMENT BASED ON A LOCATION OF A USER

BACKGROUND

A service provider may provide a service to a user via user equipment installed at a user's residence. For example, a service provider may provide a cable television service via a set-top box or a home phone service via a phone installed at the user's residence. At some point in time, the user may experience a problem with the service and call the service provider for technical support. An agent that works for the service provider may assist the user in resolving the problem with the service.

BRIEF DESCRIPTION OF THE DRAWINGS

FIG. 2 is a diagram of an example environment in which systems and/or methods, described herein, may be implemented;

FIGS. 4A-4D are flow charts of an example process for executing troubleshooting based on a geographic location of a mobile device;

DETAILED DESCRIPTION OF PREFERRED EMBODIMENTS

The following detailed description of example implementations refers to the accompanying drawings. The same reference numbers in different drawings may identify the same or similar elements.

Sometimes a user may call an agent of a service provider for help resolving a problem with user equipment when the user is not near the user equipment. For example, the user equipment (e.g., a set-top box, a phone, etc.) may at the user's residence and the user may call the agent from work or another location outside of the user's residence. However, in order to properly troubleshoot the problem with the user equipment, the agent may need the user to be near the user equipment to perform particular tasks, to confirm whether the user equipment is performing a certain function or displaying certain information, and/or to confirm whether the problem is resolved after possible solutions are attempted.

Accordingly, if the agent follows a troubleshooting routine or script that asks the user to do these tasks, confirm whether the user equipment is performing certain functions, and/or confirm whether the problem is resolved by checking the user equipment, the user will not be able to comply and the agent may be spending time on parts of the troubleshooting routine that could be avoided. In other words, the agent may be wasting time on possible solutions and/or dialogue with the user because the user is not near the user equipment and the troubleshooting routine is not tailored to such a situation.

An agent's time may be valuable and any time the agent can save may be beneficial to the agent, the service provider, the user with the problem, and other users waiting to talk to the agent. For example, if an agent can reduce the average amount of time spent on a troubleshooting phone call with a user by even a few seconds, the agent may be able to handle more troubleshooting phone calls per day. Thus, an average wait time to talk to an agent may be reduced, an average time to resolve a problem with user equipment may be reduced, and/or fewer agents may be needed to handle troubleshooting requests due to each agent being more efficient.

Implementations described herein may increase the efficiency of troubleshooting a problem with user equipment based on tailoring troubleshooting routines to a geographic location of a user. In some implementations, a mobile device used by the user may transmit location information and a troubleshooting routine may automatically be selected based on the geographic location of the mobile device. Accordingly, if the user is not near the user equipment, parts of a troubleshooting routine that require the user to be near the user equipment may be avoided, thus increasing the efficiency of the troubleshooting and reducing the amount of time an agent may spend on a troubleshooting phone call.

Figure 1A:
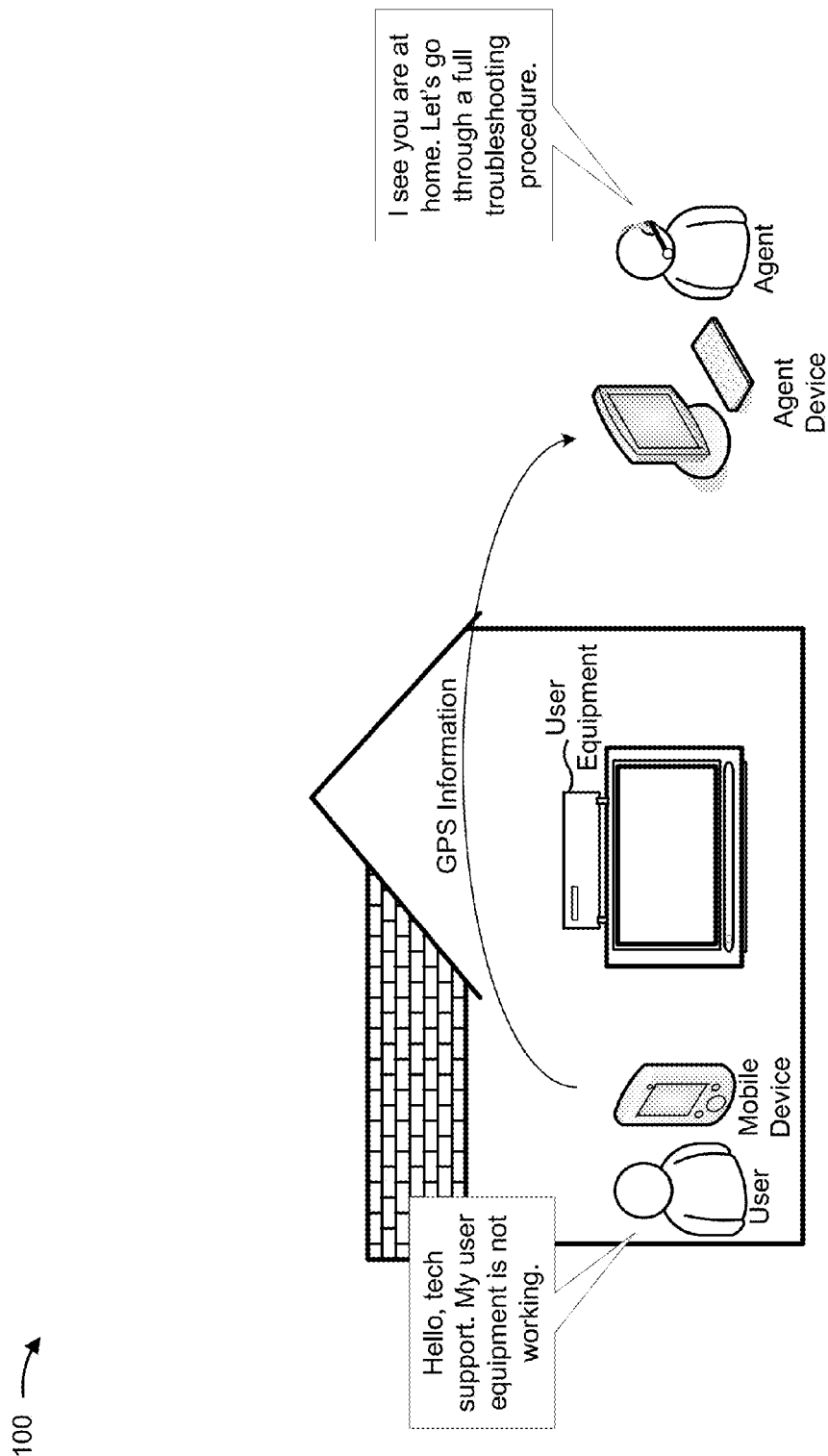
FIGS. 1A and 1B are diagrams of an overview of an example implementation described herein.
Figure 1B:
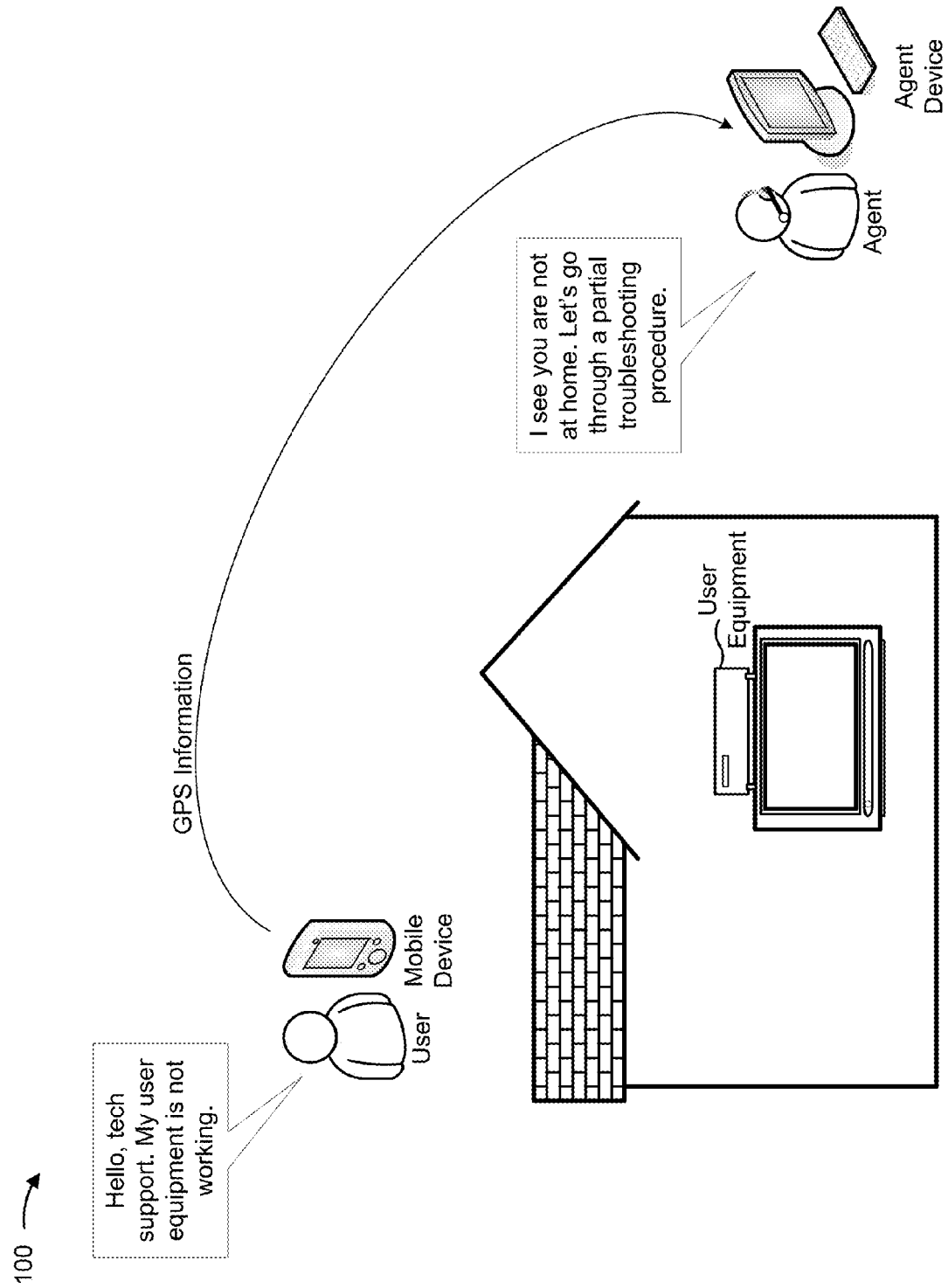

FIGS. 1A and 1B are diagrams of an overview of an example implementation 100 described herein.

In FIG. 1A, assume a user is experiencing a problem with user equipment (e.g., a set-top box) at the user's residence. Moreover, assume the user uses a mobile device to call an agent for technical support from inside the residence.

As shown in FIG. 1A, the mobile device may send global positioning system (GPS) information (or other location information) to an agent device used by the agent or to a server device that communicates with the agent device. Assume the GPS information indicates that the mobile device is at the user's residence where the user equipment is installed. The agent device may execute a full troubleshooting routine based on the mobile device being near the user equipment. For example, the full troubleshooting routine may instruct the agent to ask the user to interact with the user equipment in some way (e.g., connect a cord to the user equipment, unplug the user equipment from a power source, plug the user equipment into a power source, press a reset button, etc.), ask the user to confirm whether the user equipment is performing a certain function, and/or ask the user to confirm whether the problem has been resolved while troubleshooting. In this way, the agent may use a proper troubleshooting routine without having to discuss the user's location and/or the location of the user equipment, thus saving the agent time.

In FIG. 1B, assume a user is experiencing a problem with user equipment (e.g., a set-top box) at the user's residence. Moreover, assume the user uses a mobile device to call an agent for technical support from outside the residence.

As shown in FIG. 1B, the mobile device may send GPS information (or other location information) to an agent device used by the agent or to a server device that communicates with the agent device. Assume the GPS information indicates that the mobile device is outside of the user's residence where the user equipment is installed. The agent device may execute a partial troubleshooting routine based on the mobile device not being near the user equipment. For example, the partial troubleshooting routine may not instruct the agent to ask the user to interact with the user equipment, ask the user to confirm whether the user equipment is performing a certain function, and/or ask the user to confirm whether the problem has been resolved while troubleshooting because the user is not near the user equipment to perform these tasks or to provide these confirmations. Rather, the partial troubleshooting routine may attempt remote solutions, via the agent or the agent device, to resolve the problem with the user equipment. In this way, the agent may use a proper troubleshooting routine without having to discuss the user's location and/or the location of the user equipment, thus saving the agent time. Moreover, the agent does not waste time attempting possible solutions that may require the user to interact with or visually inspect the user equipment.

In some implementations, a user of a mobile device may be prevented from talking to the agent based on the GPS information indicating the mobile device is not near the user equipment. Thus, an agent may be spared calls from a user having a problem that may not be resolvable given the location of the user, and the agent may focus on calls from users near the user equipment, which may be resolvable. In this case, automated troubleshooting techniques may be used.

FIG. 2 is a diagram of an example environment 200 in which systems and/or methods, described herein, may be implemented. As shown in FIG. 2, environment 200 may include a mobile device 210, an agent device 220, a server device 230, user equipment 240, and a network 250. Devices of environment 200 may interconnect via wired connections, wireless connections, or a combination of wired and wireless connections.

Mobile device 210 may include a mobile/portable device capable of receiving, generating, storing, processing, and/or providing information. For example, mobile device 210 may include a communications and/or computing device, such as a mobile phone (e.g., a smart phone, a radiotelephone, etc.), a laptop computer, a tablet computer, a handheld computer, a gaming device, or a similar device. In some implementations, mobile device 210 may receive information from and/or transmit information to another device in environment 200. In some implementations, a user may use mobile device 210 to communicate with an agent to troubleshoot a problem with user equipment 240.

Agent device 220 may include a device capable of receiving, generating, storing, processing, and/or providing information. For example, agent device 220 may include a communications and/or computing device, such as a desktop computer, a laptop computer, a tablet computer, a handheld computer, and/or a similar device. Additionally, or alternatively, agent device 220 may include a phone that an agent may use to communicate with a user of mobile device 210. In some implementations, agent device 220 may receive information from and/or transmit information to another device in environment 200. In some implementations, an agent of a service provider may use agent device 220 to help a user troubleshoot a problem with user equipment 240.

Server device 230 may include one or more devices capable of storing, processing, and/or routing information. In some implementations, server device 230 may include a communication interface that allows server device 230 to receive information from and/or transmit information to other devices in environment 200.

User equipment 240 may include one or more devices that provides a service from a service provider to a user. For example, the user equipment may include a mobile phone that provides a mobile phone service, a home phone that provides a home phone service, a set-top box that provides a cable television service, a modem and/or router that provides an Internet service, a security device (e.g., a security camera, a motion sensor, etc.) that provides a home security service, a home automation device (e.g., a light switch, an appliance, a door lock, etc.) that provides a home automation service, or the like.

Network 250 may include one or more wired and/or wireless networks. For example, network 250 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
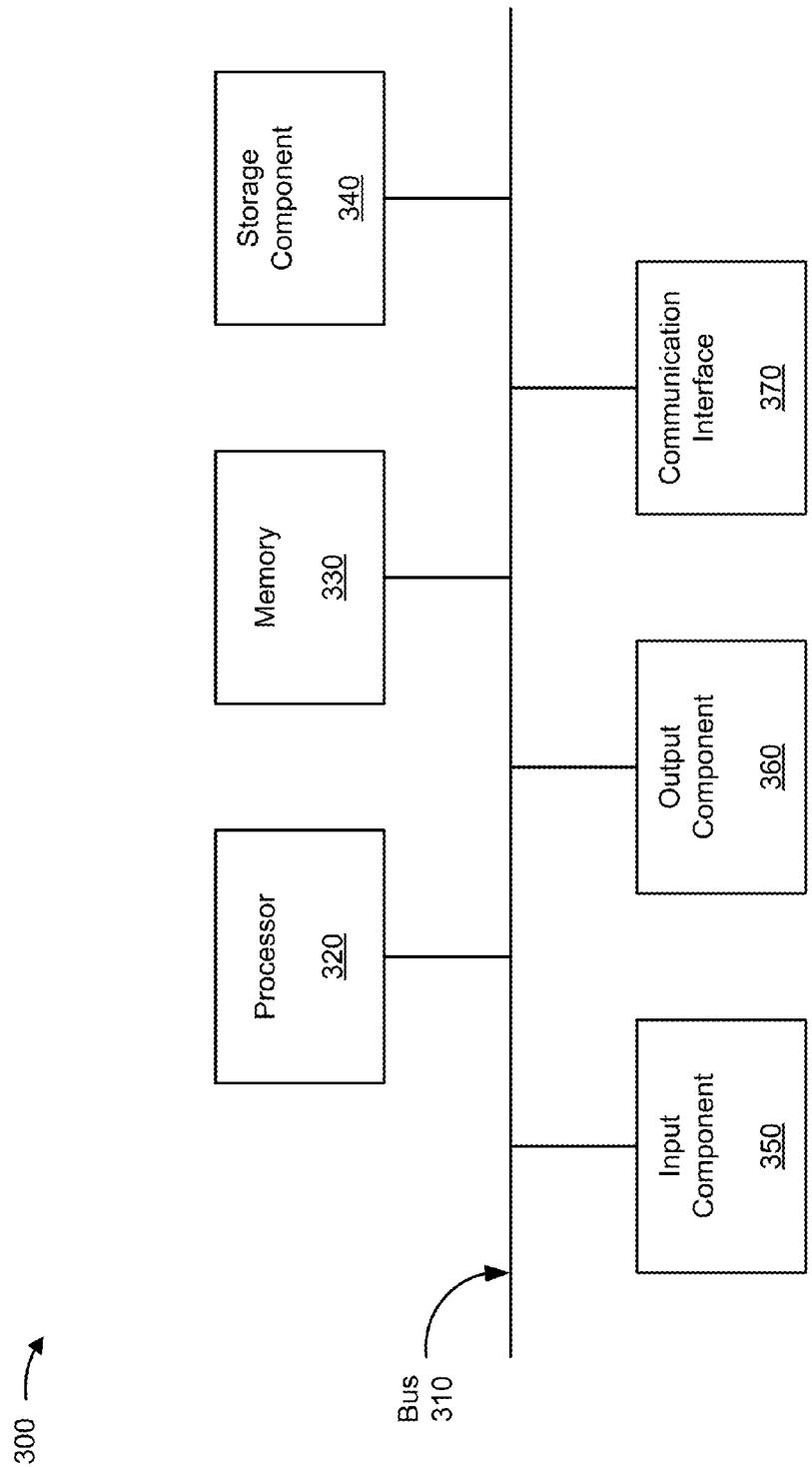
FIG. 3 is a diagram of example components of one or more devices of FIG. 2.

FIG. 3 is a diagram of example components of a device 300. Device 300 may correspond to mobile device 210, agent device 220, server device 230, and/or user equipment 240. In some implementations, mobile device 210, agent device 220, server device 230, and/or user equipment 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a GPS component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4D are flow charts of an example process 400 for executing troubleshooting based on a location of mobile device 210. In some implementations, one or more process blocks of FIGS. 4A-4D may be performed by server device 230. Additionally, or alternatively, one or more process blocks of FIGS. 4A-4D may be performed by another device or a group of devices separate from or including server device 230, such as mobile device 210, agent device 220, and/or user equipment 240.

As shown in FIG. 4A, process 400 may include receiving a technical support request to resolve a problem with user equipment 240 (block 402). For example, server device 230 may receive the technical support request.

A user may experience a problem with user equipment 240. For example, a service provided via user equipment 240 may not be working properly. The user may use mobile device 210 to send a technical support request to server device 230. The technical support request may request to connect to an agent of a service provider, which provides the service, to troubleshoot the problem with user equipment 240 and resolve the problem.

In some implementations, the technical support request may be a phone call from mobile device 210 to a technical support phone number. Server device 230 may receive the phone call and prompt the user through a series of automated menus to obtain more information about the user, user equipment 240, and/or the problem. For example, server device 230 may prompt the user to identify the type of user equipment 240 experiencing a problem and/or a user equipment identifier of user equipment 240 experiencing the problem before server device 230 transfers the call to an agent for troubleshooting. Similarly, server device 230 may prompt the user to identify the type of problem. Additionally, or alternatively, server device 230 may have the user input account information of an account with the service provider before server device 230 transfers the call to an agent for troubleshooting. On the other hand, server 230 may transfer the call to an agent without guiding the user through automated menus.

Additionally, or alternatively, mobile device 210 may execute a technical support application that sends the technical support request to service device 230. For example, the technical support application may have a user interface that allows the user to input a user equipment identifier of user equipment 240 experiencing the problem, select a type of user equipment 240 experiencing the problem, select a type of problem, input account information, input user information, and/or input other information to be sent to server device 230. The technical support application may generate the technical support request based on the user selections and/or inputs and send the technical support request to server 230 via mobile device 210.

As further shown in FIG. 4A, process 400 may include determining that resolution of the problem requires the user be at a user equipment location (block 404). For example, server device 230 may determine that the resolution of the problem requires the user be at the user equipment location. The user equipment location may be a geographic location and/or area where the user equipment location is located.

Server device 230 may determine that the resolution of the problem requires the user be at the user equipment location to complete the troubleshooting based on the type of user equipment 240 and/or the type of problem. For example, the user may have to interact with or visually inspect user equipment 240 during the troubleshooting process. For instance, the user may have to reset user equipment 240 (e.g., press a reset button on user equipment 240), unplug user equipment 240 from a power source and/or plug user equipment 240 into a power source, check physical connections between equipment 240 and other devices (e.g., an audio/video cord connection, an internet cable connection, a television cable connection, a phone line connection, etc.), or the like. Additionally, or alternatively, the user may have to be at the user equipment location to determine whether the troubleshooting process was successful and the problem is resolved. Regardless of whether the user has to interact with or visually inspect user equipment 240 during the troubleshooting process (e.g., the agent may be able to do the troubleshooting process remotely), the user may have to confirm that the problem has been resolved to complete the troubleshooting process, which may require the user to be at the user equipment location.

As further shown in FIG. 4A, process 400 may include receiving location information of the mobile device (block 406). For example, server device 230 may receive the location information.

Mobile device 210 may include a GPS device that mobile device 210 uses to determine a geographic location of mobile device 210 (i.e., a mobile device location). Mobile device 210 may send location information indicating the mobile device location to server device 230 and server device 230 may receive the location information.

In some implementations, mobile device 210 may automatically send the location information to server device 230 based on and/or with the technical support request.

Additionally, or alternatively, server device 230 may send mobile device 210 a request for the location information based on determining that resolution of the problem requires the user be at the user equipment location. Mobile device 210 may receive the request and send the location information to server device 230 based on the request.

As further shown in FIG. 4A, process 400 may include determining whether mobile device 210 is at the user equipment location (block 408). For example, server device 230 may determine whether mobile device 210 is at the user equipment location.

Server device 230 may determine the user equipment location based on the technical support request. For example, server device 230 may identify the user equipment 240 experiencing the problem based on the account information, the user information, the user equipment identifier, and/or the type of user equipment indicated by the technical support request. For instance, server device 230 may have access to a data structure that associates account information and/or user information with one or more pieces of user equipment 240. Server device 230 may identify the user equipment 240 experiencing the problem using the data structure. If more than one piece of user equipment is associated with the account, server device 230 may identify the user equipment 240 experiencing the problem based on the type of user equipment and/or the user equipment identifier indicated by the technical support request.

In some implementations, the data structure may also indicate the user equipment location of user equipment 240. Accordingly, server device 230 may obtain the user equipment location from the data structure for the identified user equipment 240. Additionally, or alternatively, server device 230 may obtain the user equipment location based on the account information (e.g., without identifying the particular user equipment 240).

Additionally, or alternatively, server device 230 may send a message to the identified user equipment 240 requesting the user equipment location. User equipment 240 may send information identifying the user equipment location to server device 230, and server device 230 may determine the user equipment location based on this information.

Server device 230 may determine whether mobile device 210 is at the user equipment location based on the user equipment location and the mobile device location.

For example, if the mobile device location is within a particular distance (e.g., a threshold distance) from the user equipment location, then server device 230 may determine mobile device 210 is at the user equipment location. On the other hand, if the mobile device location is outside of the particular distance (e.g., the threshold distance) from the user equipment location, then server device 230 may determine mobile device 210 is not at the user equipment location.

As further shown in FIG. 4A, if mobile device 210 is at the user equipment location (block 408—YES), process 400 may include connecting mobile device 210 to agent device 220 (block 410). For example, server device 230 may connect mobile device 210 to agent device 220.

In some implementations, server device 230 may connect mobile device 210 to agent device 220 by establishing a phone call between mobile device 210 and agent device 220 so that the user of mobile device 210 may talk with an agent that uses agent device 220.

As further shown in FIG. 4A, process 400 may include causing the agent device to execute a full troubleshooting routine (block 412). For example, server device 230 may cause agent device 220 to execute a full troubleshooting routine.

A troubleshooting routine may indicate instructions for troubleshooting, a script the agent uses to walk a user through a troubleshooting process, and/or a series of actions the agent is to perform during troubleshooting (e.g., remote actions to resolve the problem with user equipment 240). The full troubleshooting routine may include a full script that includes dialogue between the agent and the user that assumes mobile device 210, and the user of mobile device 210, are at the user equipment location. For example, the script may have the agent instruct the user to interact with user equipment 240, visually inspect user equipment 240, and/or confirm whether the problem is resolved. Additionally, or alternatively, the full troubleshooting routine may include a full series of actions to be performed including local actions (e.g., actions performed by the user to user equipment 240 and/or other devices connected to user equipment 240) and/or remote actions (e.g., actions performed by the agent, agent device 220, and/or other devices to resolve the problem via network 250). In other words, the full troubleshooting routine may be tailored for use with a mobile device 210 at the user equipment location.

In some implementations, server device 230 may cause agent device 220 to execute the full troubleshooting routine by providing the full troubleshooting routine to agent device 220. Agent device 220 may receive the full troubleshooting routine and present the full troubleshooting routine to the agent to perform.

On the other hand, agent device 220 may already store the full troubleshooting routine, along with troubleshooting routines for other problems and/or other types of user equipment 240. Accordingly, server device 230 may send a message to agent device 220 instructing agent device 220 to use a particular full troubleshooting routine for the type of user equipment 240 and/or the type of problem.

Additionally, or alternatively, server device 230 may send a message to agent device 220 indicating that mobile device 210 is at the user equipment location. Agent device 220 may present the message to the agent so the agent is informed that mobile device 210 is at the user equipment location.

Thus, by server device 230 causing agent device 220 to execute the full troubleshooting routine and/or notifying agent device 220 that mobile device 210 is at the user equipment location, the agent does not need to spend time discussing the location of the user and user equipment 240 and the agent may expedite the phone call and/or the troubleshooting routine. In this way, the agent saves time per phone call with a user and may handle more phone calls and/or technical support requests in a same amount of time.

Figure 4B:
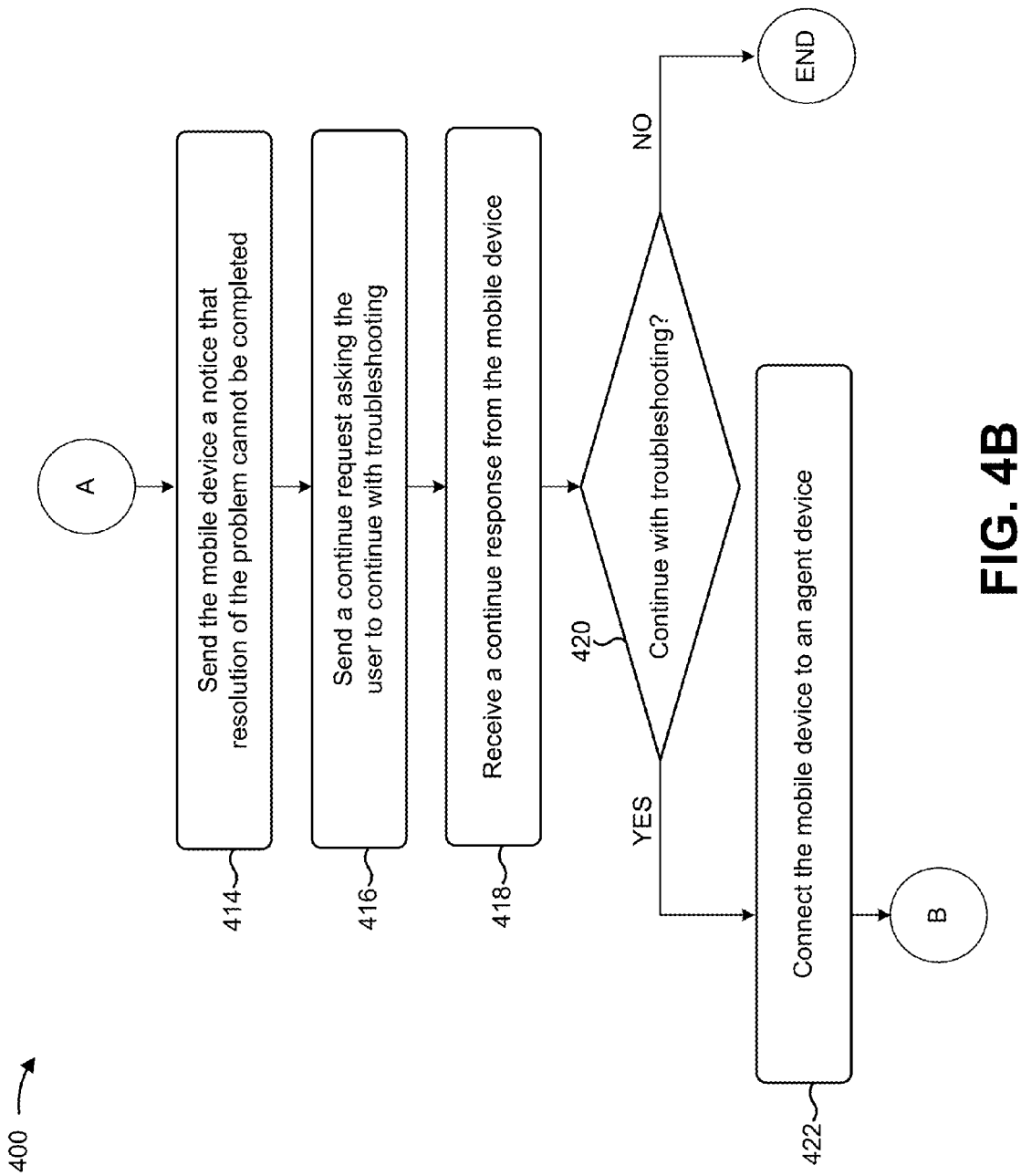

As shown in FIG. 4A, if the mobile device is not at the user equipment location (block 408—NO), process 400 may include sending mobile device 210 a notice that resolution of the problem cannot be completed (block 414) (FIG. 4B). For example, server device 230 may send the notice to mobile device 210.

The notice may indicate that the problem with user equipment 240 requires the user be at the user equipment location to complete troubleshooting. For example, the notice may indicate that the user may have to interact with or visually inspect user equipment 240 during troubleshooting to resolve the problem.

Mobile device 210 may receive the notification and present the notification to the user.

As further shown in FIG. 4B, process 400 may include sending a continue request asking the user to continue with troubleshooting (block 416). For example, server device 230 may send the continue request to mobile device 210.

Mobile device 210 may receive the continue request and present the continue request to the user. The user may input a selection to continue with troubleshooting or to not continue with troubleshooting. Mobile device 210 may generate a continue response based on the selection and send the continue response to server device 230.

As further shown in FIG. 4B, process 400 may include receiving the continue response from the mobile device (block 418). For example, server device 230 may receive the continue response sent by mobile device 210. The continue response may indicate whether the user wants to continue with troubleshooting even though the user (and mobile device 210) are not at the user equipment location.

As further shown in FIG. 4B, process 400 may include determining whether to continue with troubleshooting (block 420). For example, server device 230 may determine whether to continue with troubleshooting based on the continue response and/or the mobile device location.

If the continue response indicates the user wants to continue with troubleshooting, then server device 230 may determine to continue with troubleshooting. On the other hand, if the continue response indicates the user does not want to continue with troubleshooting, then server device 230 may determine to end troubleshooting. In some implementations, server device 230 may determine to end troubleshooting based on the mobile device location being greater than a particular distance from the user equipment location.

In some implementations, if troubleshooting ends (block 420—NO), then server device 230 may not connect mobile device 210 to agent device 220. In this way, a mobile device 210 that requested troubleshooting, but is not at the user equipment location to perform full troubleshooting, may be prevented from being connected to an agent. Accordingly, the agent may not have to spend time troubleshooting a problem with the user that may not be resolvable without the user being at the user equipment location. Moreover, the agent may not have to spend time discussing the location of the user and the location of the user equipment before determining that troubleshooting may not be able to resolve the problem with user equipment 240. Accordingly, the agent may spend more time on phone calls with other users that are at a user equipment location and may perform full troubleshooting. Consequently, the agent may not waste time on phone calls with users that may not have a resolvable problem.

In some implementations, server device 230 may perform automated troubleshooting to attempt to resolve the issue before ending the troubleshooting. For example, server device 230 may send a remote reset request, send a remote ping, etc. and then end troubleshooting.

Figure 4C:
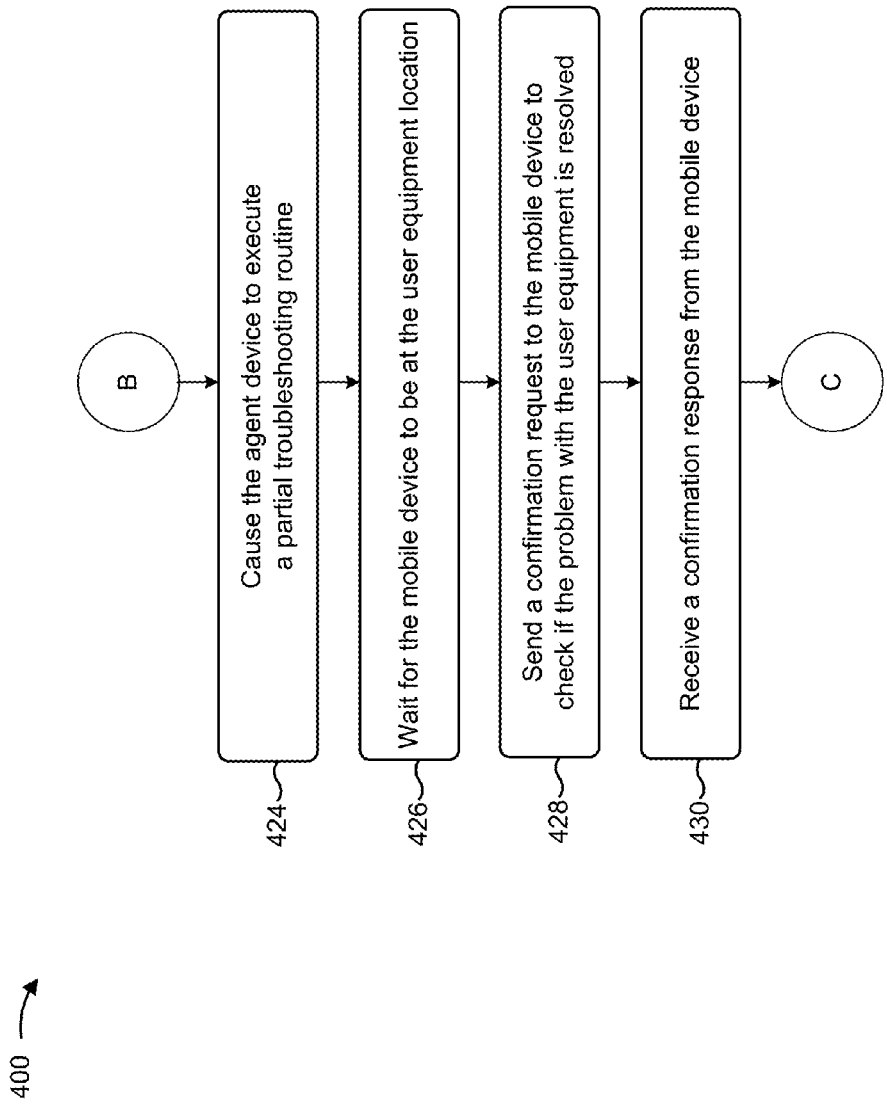

Additionally, or alternatively, if troubleshooting ends (block 420—NO), then server device 230 may advance to block 426 of FIG. 4C and wait for mobile device 210 to be at the user equipment location before continuing troubleshooting.

As further shown in FIG. 4B, if troubleshooting continues (block 420—YES), process 400 may include connecting mobile device 210 to agent device 220 (block 422). For example, server device 230 may connect mobile device 210 to agent device 220.

In some implementations, server device 230 may connect mobile device 210 to agent device 220 by establishing a phone call between mobile device 210 and agent device 220 so that the user of mobile device 210 may talk with an agent that uses agent device 220, as described above.

As shown in FIG. 4C, process 400 may include causing the agent device to execute a partial troubleshooting routine (block 424). For example, server device 230 may cause agent device 220 to execute the partial troubleshooting routine.

As previously discussed, a troubleshooting routine may indicate a script the agent uses to walk a user through a troubleshooting process and/or a series of actions the agent is to perform during troubleshooting (e.g., remote actions to resolve the problem with user equipment 240). The partial troubleshooting routine may be a part of the full troubleshooting routine or a variation of the full troubleshooting routine that does require the user be at the user equipment location. The partial troubleshooting routine may be shorter than the full troubleshooting routine and/or take less time for the agent to complete than the full troubleshooting routine. In other words, the partial troubleshooting routine may be tailored for use with a mobile device 210 located greater than a particular distance from the user equipment location.

The partial troubleshooting routine may include a partial script that includes dialogue between the agent and the user that assumes mobile device 210 and the user of mobile device 210 are not at the user equipment location. The partial script may not include dialogue between the agent and the user that assumes mobile device 210, and the user of mobile device 210, are at the user equipment location like the full script includes. For example, the partial script may not have the agent instruct the user to interact with or visually inspect user equipment 240. Additionally, or alternatively, the partial troubleshooting routine my include a partial series of actions to be performed that does not include actions that are performed by the user in relation to user equipment 240 and/or other devices connected to user equipment 240. For example, the partial troubleshooting routine may only include remote actions that may be performed by the agent and/or agent device 220 to attempt to resolve the problem with user equipment 240.

In some implementations, server device 230 may cause agent device 220 to execute the partial troubleshooting routine by providing the partial troubleshooting routine to agent device 220. Agent device 220 may receive the partial troubleshooting routine and present the partial troubleshooting routine to the agent to perform.

On the other hand, agent device 220 may already store the partial troubleshooting routine, along with troubleshooting routines for other problems and/or other types of user equipment 240. Accordingly, server device 230 may send a message to agent device 220 instructing agent device 220 to use a particular partial troubleshooting routine for the type of user equipment 240 and/or the type of problem.

Additionally, or alternatively, server device 230 may send a message to agent device 220 indicating that mobile device 210 is not at the user equipment location. Agent device 220 may present the message to the agent so the agent is informed that mobile device 210 is not at the user equipment location.

Thus, by server device 230 causing agent device 220 to execute the partial troubleshooting routine and/or notifying agent device 220 that mobile device 210 is not at the user equipment location, the agent does not need to spend time discussing the location of the user and user equipment 240, and the agent may expedite the phone call and/or the troubleshooting routine. Moreover, the agent does not spend time instructing the user to interact with the user equipment and/or to confirm whether the problem has been resolved because such actions would be futile since the user is not at the user equipment location. Accordingly, the agent may expedite the phone call with the user leaving more time for other phone calls with other users.

As further shown in FIG. 4C, process 400 may include waiting for mobile device 210 to be at the user equipment location (block 426). For example, server device 230 may wait for mobile device 210 to be at the user equipment location.

In some implementations, server device 230 may send mobile device 210 an instruction to notify server device 230 when mobile device 210 is at the user equipment location. The instruction may indicate the user equipment location so that mobile device 210 may determine whether mobile device 210 is at the user equipment location. Mobile device 210 may receive the instruction and determine when the mobile device location is within a particular distance of the user equipment location using the GPS device included in mobile device 210. Thus, when mobile device 210 moves within the particular distance of the user equipment location, mobile device 210 may send a notification to server device 230 that mobile device 210 is at the user equipment location. Server device 230 may receive the notification and determine that mobile device 210 is at the user equipment location based on the notification.

Additionally, or alternatively, server device 230 may send mobile device 210 an instruction to continuously or periodically send location information indicating the mobile device location. Mobile device 210 may receive the instruction and send the location information to server device 230. Server device 230 may receive the location information indicating the mobile device location and determine when the location information indicates mobile device 210 is at the user equipment location.

As further shown in FIG. 4C, process 400 may include sending a confirmation request to mobile device 210 to check if the problem with user equipment 240 is resolved (block 428). For example, server device 230 may send the confirmation request to mobile device 210 based on server device 230 determining mobile device 210 is at the user equipment location.

The confirmation request may ask the user to confirm whether the partial troubleshooting successfully resolved the problem with user equipment 240. In some implementations, the confirmation request may be an automated phone call, a text message, an email, a push notification, an alert through the technical support application, or the like.

Mobile device 210 may receive the confirmation request and present the confirmation request to the user. The user may check whether the problem with user equipment 240 is resolved. The user may input information indicating whether the problem is resolved into mobile device 210 and mobile device 210 may generate a confirmation response based on the user input. Mobile device 210 may send the confirmation response to server device 230 based on the confirmation request.

As further shown in FIG. 4C, process 400 may include receiving the confirmation response from mobile device 210 (block 430). For example, server device 230 may receive the confirmation response from mobile device 210.

Figure 4D:
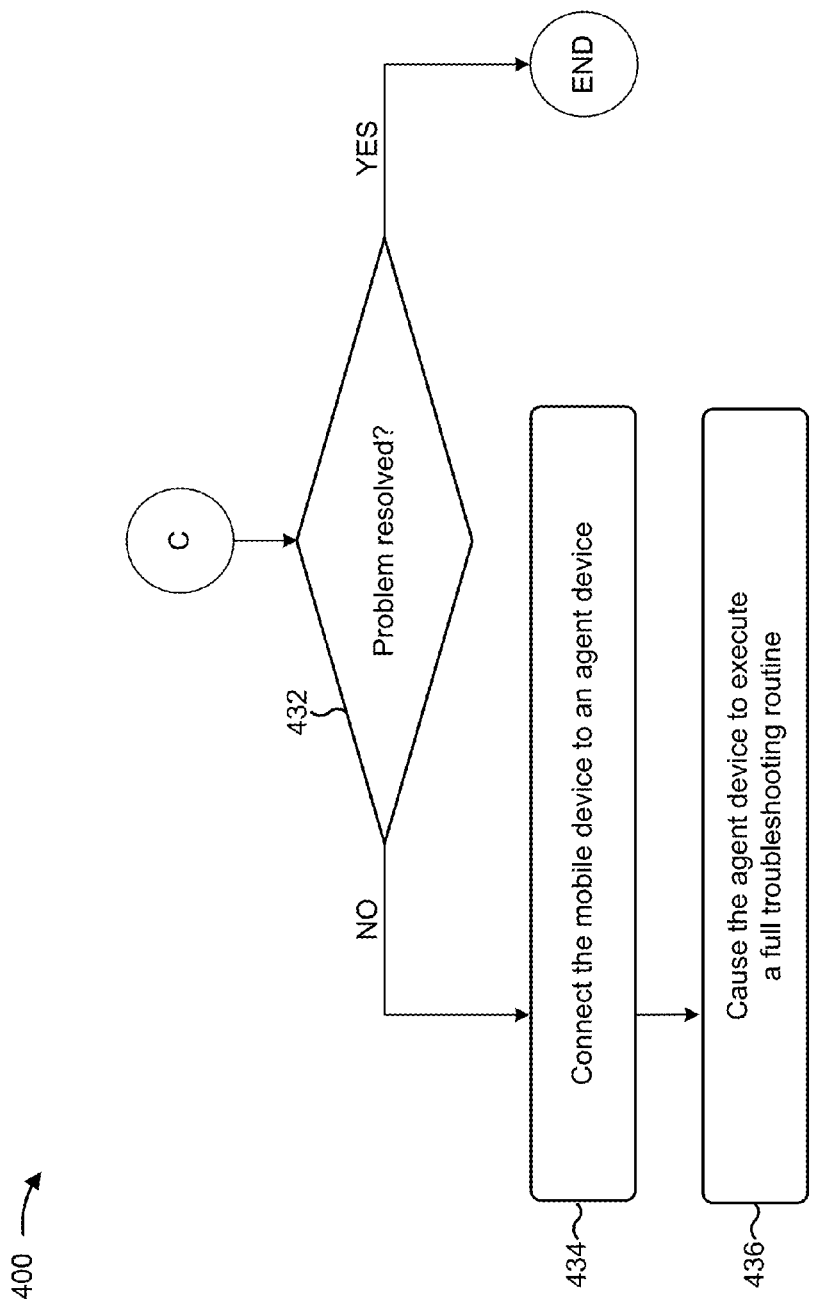

As shown in FIG. 4D, process 400 may include determining whether the problem is resolved (block 432). For example, server device 230 may determine whether the problem is resolved based on the confirmation response.

If the confirmation response indicates the problem with user equipment 240 is resolved or mobile device 210 fails to respond to the confirmation request, then server device 230 may determine the problem is resolved. Accordingly, if server device 230 determines the problem is resolved (block 432—YES), then process 400 may end and mobile device 210 may be prevented from connecting to agent device 220 again. In this way, the agent does not have to spend time confirming whether the partial troubleshooting successfully resolved the problem. Moreover, the agent only had to spend enough time to go through the partial troubleshooting routine to resolve the problem instead of spending more time to go through the full troubleshooting routine to resolve the problem with user equipment 240. Accordingly, the agent is left with more time to attend to other users that need help.

On the other hand, if the confirmation response indicates the problem with user equipment 240 is not resolved, then server device 230 may determine the problem is not resolved.

As further shown in FIG. 4D, if the problem has not been resolved (block 432—NO), process 400 may include connecting mobile device 210 to agent device 220 (block 434). For example, server device 230 may connect mobile device 210 to agent device 220.

In some implementations, server device 230 may connect mobile device 210 to agent device 220 by establishing a phone call between mobile device 210 and agent device 220 so that the user of mobile device 210 may talk with an agent that uses agent device 220, as described above.

As further shown in FIG. 4D, process 400 may include causing the agent device to execute a full troubleshooting routine (block 436). For example, server device 230 may cause agent device 220 to execute a full troubleshooting routine, as described above.

Thus, by server device 230 causing agent device 220 to execute the full troubleshooting routine and/or notifying agent device 220 that mobile device 210 is at the user equipment location, the agent does not need to spend time discussing the location of the user and user equipment 240 and the agent may expedite the phone call and/or the troubleshooting routine. In this way, the agent saves time per phone call with a user and may handle more phone calls and/or technical support requests in a same amount of time.

In some implementations, rather than causing agent device 220 to perform the full troubleshooting routine, server device 230 may cause agent device 220 to perform a modified version of the full troubleshooting routine based on the partial troubleshooting routine already having been performed. For example, the modified version of the full troubleshooting routine may not include actions and/or possible solutions that were already performed during the partial troubleshooting routine and that did not resolve the problem with user equipment 240. In other words, server device 230 may cause agent device 220 to perform a troubleshooting routine that could not be performed earlier when mobile device 210 was not at the user equipment location without repeating all or part of the partial troubleshooting routine that has already been performed. In this way, the agent does not spend time on dialogue, actions, and/or possible solutions that were performed earlier. Accordingly, the agent may have more time for other phone calls with other users.

Although FIGS. 4A-4D show example blocks of process 400, in some implementations, process 400 may include additional blocks, fewer blocks, different blocks, or differently arranged blocks than those depicted in FIGS. 4A-4D. Additionally, or alternatively, two or more of the blocks of process 400 may be performed in parallel.

Figure 5:
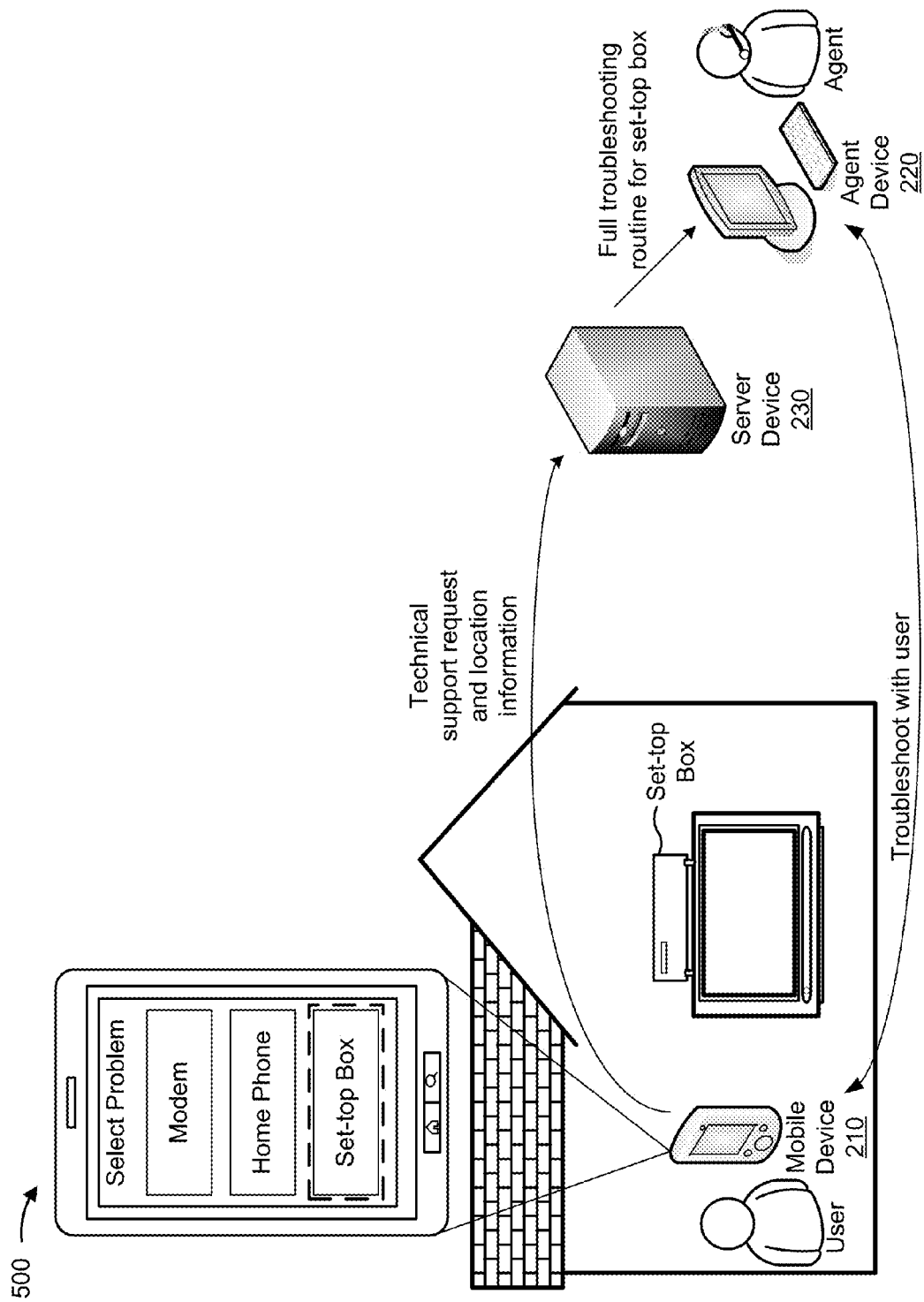
FIG. 5 is a diagram of an example implementation relating to the example process shown in FIGS. 4A-4D.

FIG. 5 is diagram of an example implementation 500 relating to example process 400 shown in FIGS. 4A-4D. FIG. 5 shows an example of executing troubleshooting based on a location of mobile device 210.

In FIG. 5, assume a user is experiencing a problem with a set-top box (e.g., user equipment 240). Further, assume the user is at a residence where the set-top box is located. As shown in FIG. 5, the user may execute a technical support application on mobile device 210. Assume the technical support application is associated with a user's account with a service provider. For example, the technical support application may store information about different pieces of user equipment 240 that the user uses to receive a service from the service provider. The technical support application may prompt the user to select a piece of user equipment 240 that is experiencing a problem. As shown in FIG. 5, assume the user selects the set-top box from a user interface provided by the technical support application.

As shown in FIG. 5, mobile device 210 may generate a technical support request based on the selection of the set-top box, and mobile device 210 may send the technical support request to server device 230. Furthermore, assume mobile device 210 generates location information indicating a location of mobile device 210. Mobile device 210 may send the location information to server device 230.

Server device 230 may receive the technical support request and the location information from mobile device 210. Assume server device 230 determines mobile device 210 is near the set-top box (e.g., at the user equipment location) based on the location information. Accordingly, assume server device 230 selects a full troubleshooting routine for resolving a problem with a set-top box based on the location information indicating mobile device 210 is at the user equipment location. Server device 230 may provide the full troubleshooting routine to agent device 220 and establish a phone a call between agent device 220 and mobile device 210.

Agent device 220 may present the full troubleshooting routine to the agent and the agent may troubleshoot the problem with the set-top box with the user. Accordingly, the agent may know which troubleshooting routine to use without having to discuss the location of the user and/or the location of the set-top box with the user.

The full troubleshooting routine may cause the agent to ask the user which lights on the set-top box are on, what screen is displayed on a display device connected to the set-top box, and the like to diagnose the problem with the set-top box. Such questions may require the user to be near the set-top box. Additionally, the agent may ask the user to press a reset button on the set-top box to attempt to resolve the problem. The agent may then ask the user whether pressing the reset button resolved the problem, which may require the user to be near the set-top box. The agent may go through a list of actions (e.g., remote actions performed by the agent and/or agent device, or local actions performed by the user at the user equipment location) until the problem is resolved.

In this way, the agent may use a proper troubleshooting routine to resolve the problem with the set-top box without spending time discussing the location of the user and/or the set-top box with the user. Thus, the agent may save time on the phone call with the user and have more time for other phone calls with other users.

As indicated above, FIG. 5 is provided merely as an example. Other examples are possible and may differ from what was described with regard to FIG. 5.

FIGS. 6A-6D are diagrams of an example implementation 600 relating to example process 400 shown in FIGS. 4A-4D. FIGS. 6A-6D show an example of executing troubleshooting based on a location of mobile device 210.

Figure 6A:
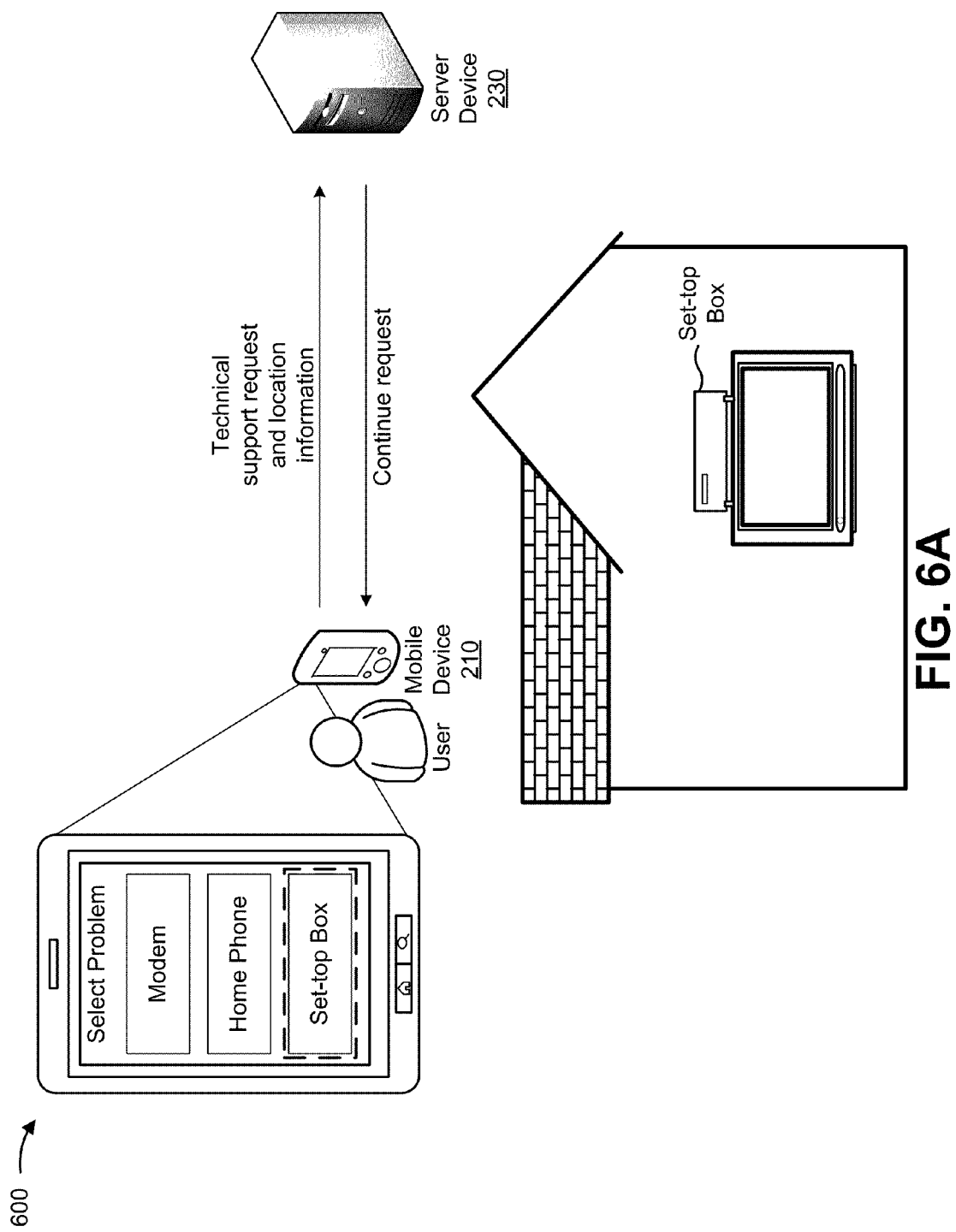
FIGS. 6A-6D are diagrams of an example implementation relating to the example process shown in FIGS. 4A-4D.

In FIG. 6A, assume a user is experiencing a problem with a set-top box (e.g., user equipment 240). Further, assume the user is outside a residence where the set-top box is located. As shown in FIG. 6A, the user may execute a technical support application on mobile device 210. Assume the technical support application is associated with a user's account with a service provider. For example, the technical support application may store information about different pieces of user equipment 240 that the user uses to receive a service from the service provider. The technical support application may prompt the user to select a piece of user equipment 240 that is experiencing a problem. As shown in FIG. 6A, assume the user selects the set-top box from a user interface provided by the technical support application.

As shown in FIG. 6A, mobile device 210 may generate a technical support request based on the selection of the set-top box, and mobile device 210 may send the technical support request to server device 230. Furthermore, assume mobile device 210 generates location information indicating a location of mobile device 210. Mobile device 210 may send the location information to server device 230.

Server device 230 may receive the technical support request and the location information from mobile device 210. Assume server device 230 determines mobile device 210 is not near the set-top box (e.g., greater than a particular distance from the user equipment location) based on the location information. Accordingly, server device 230 may send mobile device 210 a continue request asking the user if the user wants to continue with troubleshooting even though the problem may not be resolvable when the user is not near the set-top box.

Figure 6B:
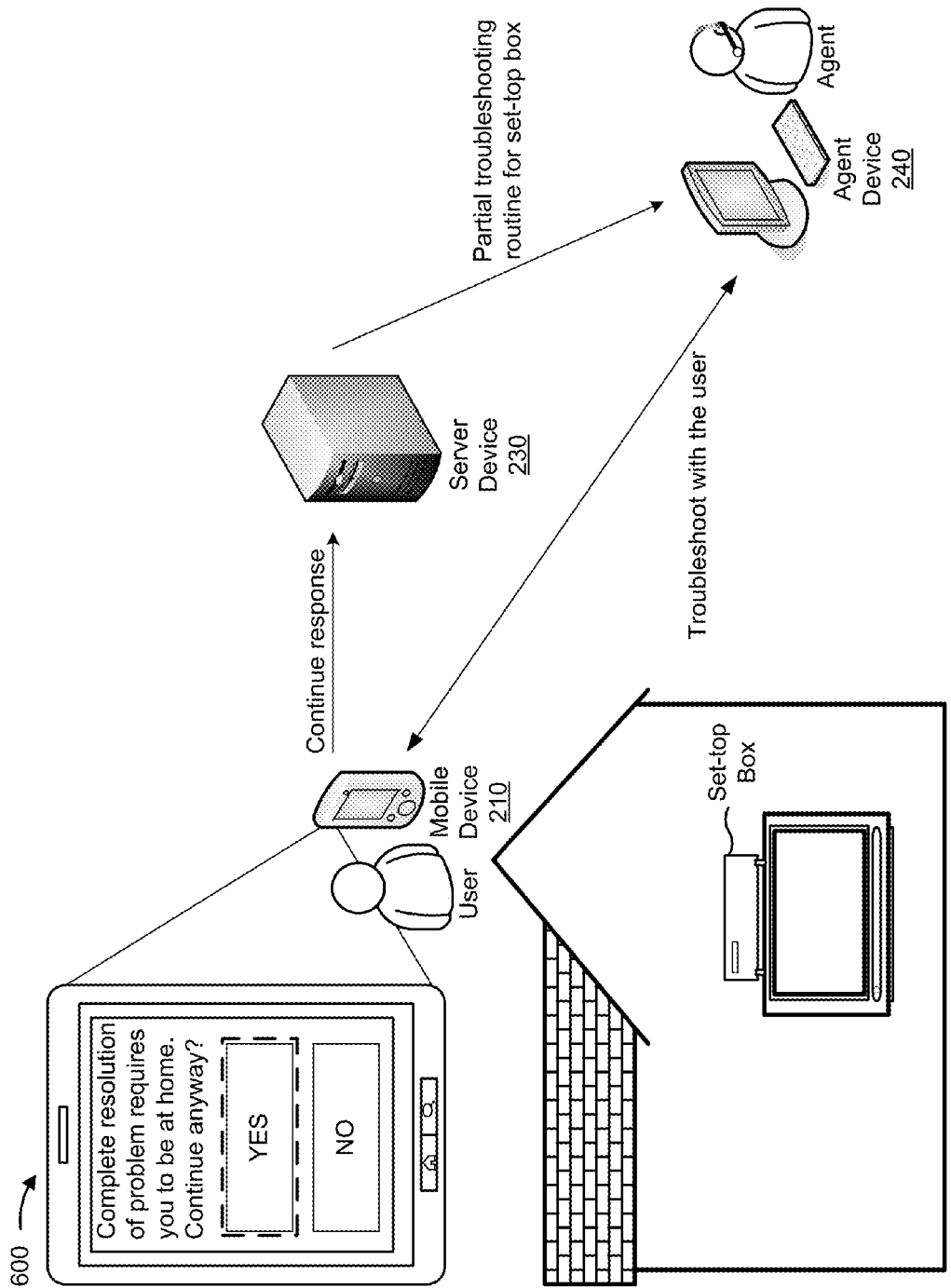

As shown in FIG. 6B, assume mobile device 210 receives the continue request and causes the technical support application to display a user interface that asks the user whether to continue with troubleshooting. Assume the user inputs a selection to continue with troubleshooting (e.g., selects "YES" in FIG. 6B). Assume mobile device 210 generates a continue response indicating the user wants to continue with troubleshooting. Mobile device 210 may send the continue response to server device 230.

Server device 230 may receive the continue response and select a partial troubleshooting routine for troubleshooting the problem with the set-top box based on mobile device 210 not being near the set-top box. Server device 230 may provide the partial troubleshooting routine to agent device 220 and establish a phone call between agent device 220 and mobile device 210.

Agent device 220 may present the partial troubleshooting routine to the agent and the agent may troubleshoot the problem with the set-top box with the user. Accordingly, the agent may know which troubleshooting routine to use without having to discuss the location of the user and/or the location of the set-top box with the user. The agent may attempt remote solutions to resolve the problem with the set-top box based on the partial troubleshooting routine. Moreover, the partial troubleshooting routine may avoid dialogue or actions that would require the user to be near the set-top box, thus saving the agent time.

Assume the agent and the user complete the partial troubleshooting, but that the user cannot confirm whether the problem is resolved because the user is not near the set-top box.

Figure 6C:
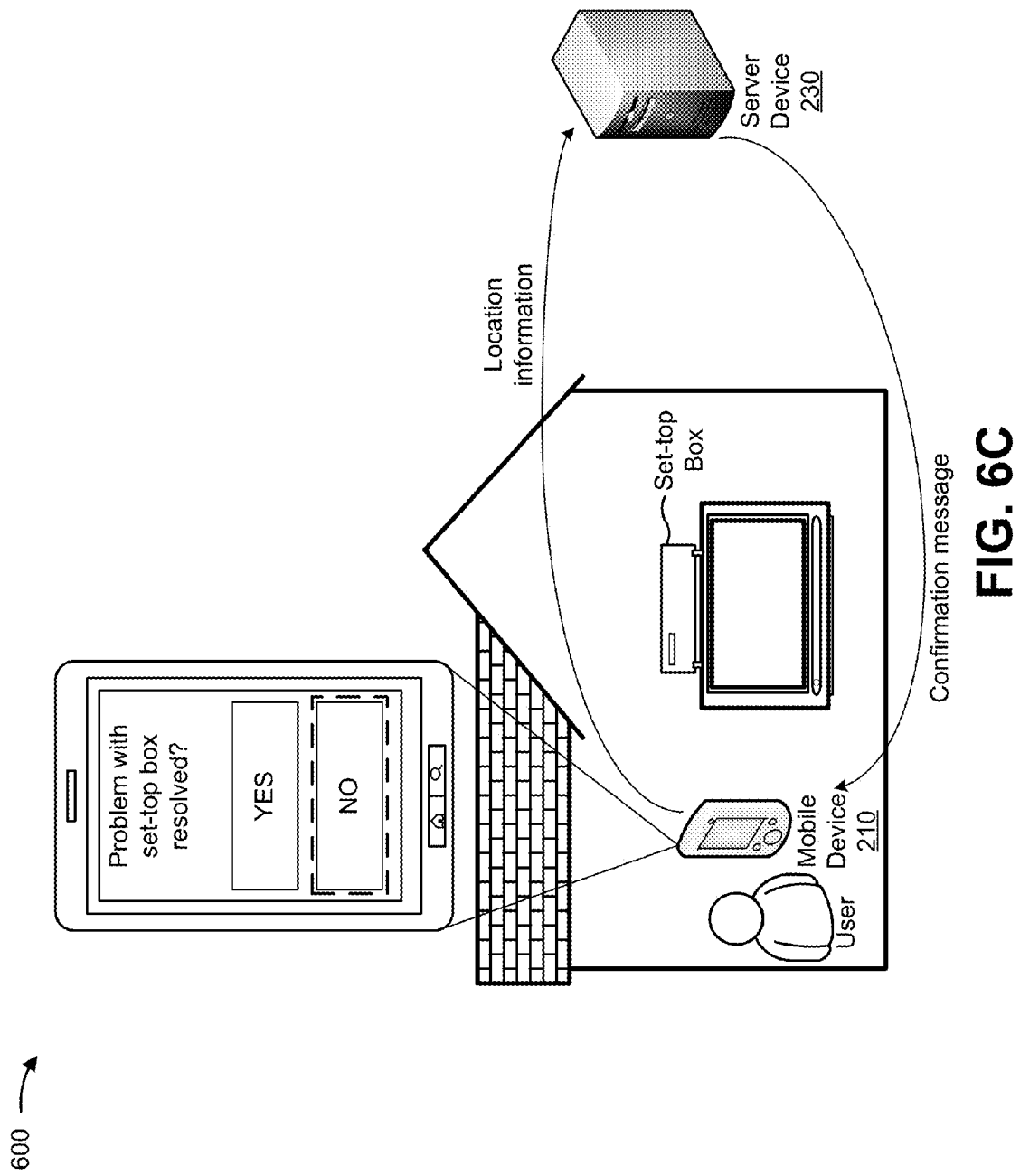

As shown in FIG. 6C, assume the user returns to the user's residence at a later time. Mobile device 210 may transmit location information to server device 230. Server device 230 may receive the location information and determine mobile device 210 is now near the set-top box. Server device 230 may send a confirmation message to mobile device 210 based on mobile device 210 being near the set-top box. The confirmation message may ask the user to confirm whether the problem with the set-top box is resolved.

Assume mobile device 210 receives the confirmation message and causes the technical support application to display a user interface that asks the user whether the problem with the set-top box is resolved. Assume the user inputs a selection that the problem is not resolved (e.g., selects "NO" in FIG. 6C).

Figure 6D:
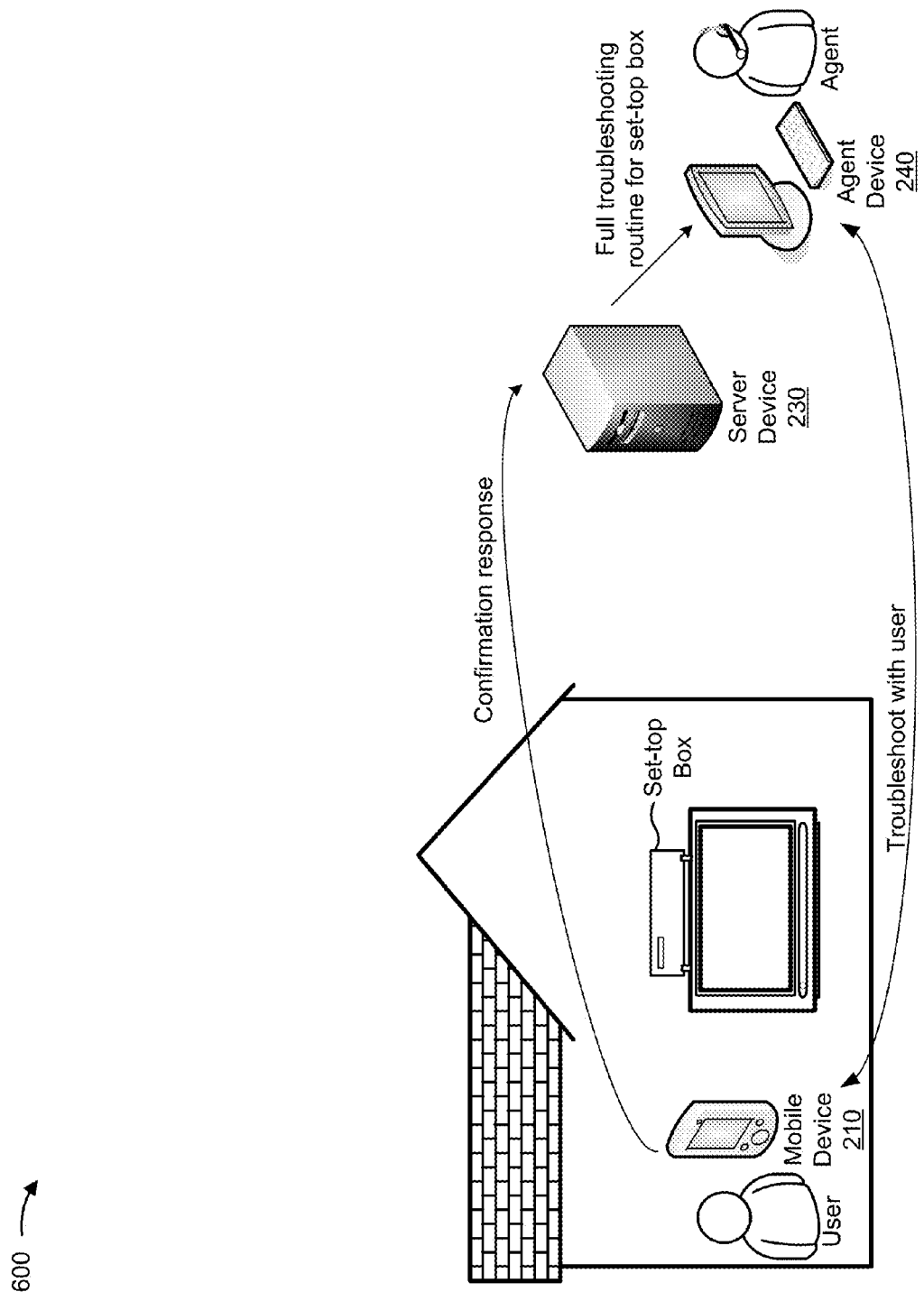

As shown in FIG. 6D, assume mobile device 210 generates a confirmation response indicating that the problem is not resolved. Mobile device 210 may send the confirmation response to server device 230. Service device 230 may receive the confirmation response and determine a full troubleshooting routine should be executed based on the problem not being resolved and mobile device 210 being near the set-top box. Server device 230 may provide the full troubleshooting routine to agent device 220 and establish a phone call between agent device 220 and mobile device 210.

Agent device 220 may present the full troubleshooting routine to the agent and the agent may troubleshoot the problem with the set-top box with the user. Accordingly, the agent may know which troubleshooting routine to use without having to discuss the location of the user and/or the location of the set-top box with the user.

As indicated above, FIGS. 6A-6D are provided merely as an example. Other examples are possible and may differ from what was described with regard to FIGS. 6A-6D.

Implementations described herein may increase the efficiency of troubleshooting a problem with user equipment, of a user, based on tailoring troubleshooting routines to a location of the user. In some implementations, a mobile device used by the user may transmit location information and a troubleshooting routine may automatically be selected based on the location of the mobile device. Accordingly, if the user is not near the user equipment, parts of a troubleshooting routine that require the user to be near the user equipment may be avoided, thus increasing the efficiency of the troubleshooting and reducing the amount of time an agent may spend on a troubleshooting phone call.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
receive a technical support request from a mobile device,
the technical support request requesting troubleshooting for a problem with user equipment;
receive location information from the mobile device indicating a mobile device location,
the mobile device location being a first geographic location of the mobile device;

determine whether the mobile device is at a user equipment location based on the mobile device location,
the user equipment location being a second geographic location of the user equipment;
select a troubleshooting routine based on whether the mobile device is at the user equipment location,
where the one or more processors, when selecting the troubleshooting routine, are further to:
select a first troubleshooting routine tailored for use when the mobile device is at the user equipment location when the mobile device is determined to be at the user equipment location based on the mobile device information from the mobile device; and
select a second troubleshooting routine tailored for use when the mobile device is not at the user equipment location based on the mobile device not being at the user equipment location when the mobile device is determined to be outside of the user equipment location based on the mobile device information from the mobile device,
the first troubleshooting routine being different than the second troubleshooting routine; and
provide, to an agent device, the selected troubleshooting routine to cause the agent device to troubleshoot the user equipment using the troubleshooting routine.

2. The device of claim 1, where the one or more processors are further to:
determine that a resolution of the problem requires the mobile device be at the user equipment location; and
where the one or more processors, when receiving the location information, are further to:
receive the location information based on determining that the resolution of the problem requires the mobile device be at the user equipment location.

3. The device of claim 1, where the first troubleshooting routine indicates a local action to be performed by a user of the mobile device at the user equipment location, and
where the second troubleshooting routine does not indicate the local action to be performed by the user of the mobile device at the user equipment location.

4. The device of claim 1, where the second troubleshooting routine takes less time to execute than the first troubleshooting routine.

5. The device of claim 1, where the one or more processors are further to:
establish a phone call between the agent device and the mobile device.

6. The device of claim 1, where the second troubleshooting routine tailored for use when the mobile device is not at the user equipment location does not include confirming whether the problem with the user equipment is resolved.

7. The device of claim 1, where the first troubleshooting routine tailored for use when the mobile device is at the user equipment location includes an action at the user equipment location to be performed by a user.

8. A non-transitory computer-readable medium storing instructions, the instructions comprising:
one or more instructions that, when executed by one or more processors, cause the one or more processors to:
receive a technical support request from a mobile device,
the technical support request requesting troubleshooting for a problem with user equipment;
receive location information from the mobile device indicating a mobile device location,
the mobile device location being a first geographic location of the mobile device;
determine whether the mobile device is at a user equipment location based on the mobile device location,
the user equipment location being a second geographic location of the user equipment; and
selectively cause the troubleshooting to be provided to a user of the mobile device based on whether the mobile device is at the user equipment location,
where the one or more instructions, when selectively causing the troubleshooting, further cause the one or more processors to:
selectively cause a first troubleshooting routine, tailored for use when the mobile device is at the user equipment location, to be provided when the mobile device is determined to be at the user equipment location based on the mobile device location from the mobile device; and
selectively cause no troubleshooting routine or a second troubleshooting routine, tailored for use when the mobile device is not at the user equipment location, to be provided based on the mobile device not being at the user equipment location when the mobile device is determined to be outside of the user equipment location based on the mobile device location from the mobile device,
the first troubleshooting routine being different than the second troubleshooting routine.

9. The non-transitory computer-readable medium of claim 8, where the one or more instructions, when determining whether the mobile device is at the user equipment location, further cause the one or more processors to:
determine the mobile device is not at the user equipment location; and
where the one or more instructions, when selectively causing the troubleshooting to be provided to the user of the mobile device, further cause the one or more processors to:
prevent the troubleshooting from being provided to the user of the mobile device based on the mobile device not being at the user equipment location.

10. The non-transitory computer-readable medium of claim 9, where the one or more instructions, when executed by the one or more processors, further cause the one or more processors to:
send a notification to the mobile device that troubleshooting cannot be completed based on the mobile device not being at the user equipment location.

11. The non-transitory computer-readable medium of claim 8, where the one or more instructions, when determining whether the mobile device is at the user equipment location, further cause the one or more processors to:
determine the mobile device is not at the user equipment location; and
where the one or more instructions, when executed by the one or more processors, further cause the one or more processors to:
send a request to the mobile device asking the user of the mobile device whether the user wants to continue with the second troubleshooting routine based on the mobile device not being at the user equipment location;

receive a response from the mobile device, based on the request, that indicates whether the user wants to continue with the second troubleshooting routine; and where the one or more instructions, when selectively causing the second troubleshooting routine to be provided to the user of the mobile device, further cause the one or more processors to:

selectively cause the second troubleshooting routine to be provided to the user of the mobile device based on the response.

12. The non-transitory computer-readable medium of claim 8, where the one or more instructions, when selectively cause the troubleshooting to be provided to the user of the mobile device, further cause the one or more processors to:

selectively establish a phone call between an agent device and the mobile device to provide either the first troubleshooting routine or the second troubleshooting routine based on whether the mobile device is at the user equipment location.

13. The non-transitory computer-readable medium of claim 8, where the one or more instructions, where the one or more instructions, when determining whether the mobile device is at the user equipment location, further cause the one or more processors to:

determine the mobile device is not at the user equipment location; and where the one or more instructions, when selectively causing the troubleshooting to be provided to the user of the mobile device, further cause the one or more processors to:

cause the second troubleshooting routine to be provided to the user of the mobile device based on the mobile device not being at the user equipment location.

14. The non-transitory computer-readable medium of claim 8, where the one or more instructions, when determining whether the mobile device is at the user equipment location, further cause the one or more processors to:

determine the mobile device is at the user equipment location; and where the one or more instructions, when selectively causing the troubleshooting to be provided to the user of the mobile device, further cause the one or more processors to:

cause the first troubleshooting routine to be provided to the user of the mobile device based on the mobile device being at the user equipment location,
the first troubleshooting routine including an action at the user equipment location to be performed by a user.

15. A method comprising:

receiving, by a device, a technical support request from a mobile device, the technical support request requesting troubleshooting for a problem with user equipment;

receiving, by the device, location information from the mobile device indicating a mobile device location,
the mobile device location being a first geographic location of the mobile device;

determining, by the device, that the mobile device is not at a user equipment location based on the mobile device location,
the user equipment location being a second geographic location of the user equipment;

selecting, by the device, a troubleshooting routine tailored for use when the mobile device is not at the user equipment location based on the mobile device not being at the user equipment location;

causing, by the device, an agent device to execute the troubleshooting routine; and causing, by the device, the agent device to communicate with the mobile device to provide troubleshooting using the troubleshooting routine.

16. The method of claim 15, further comprising:

detecting that the mobile device has moved to the user equipment location; and sending a confirmation request to the mobile device based on detecting that the mobile device has moved into the user equipment location,
the confirmation request asking a user of the mobile device to confirm whether the problem with the user equipment is resolved.

17. The method of claim 16, where the troubleshooting routine is a first troubleshooting routine, the method further comprising:

receiving a confirmation response from the mobile device based on the confirmation request,
the confirmation response indicating the problem with the user equipment is not resolved;

selecting a second troubleshooting routine tailored for use when the mobile device is at the user equipment location based on the confirmation response,
the second troubleshooting routine being different than the first troubleshooting routine;

causing the agent device to execute the second troubleshooting routine; and causing the agent device to communicate with the mobile device to provide troubleshooting using the second troubleshooting routine.

18. The method of claim 15, where the troubleshooting routine is a first troubleshooting routine, the method further comprising:

detecting that the mobile device has moved to the user equipment location; and selecting a second troubleshooting routine tailored for use when the mobile device is at the user equipment location based on detecting that the mobile device has moved to the user equipment location,
the second troubleshooting routine being different than the first troubleshooting routine;

causing the agent device to execute the second troubleshooting routine; and causing the agent device to communicate with the mobile device to provide troubleshooting using the second troubleshooting routine.

19. The method of claim 18, where the first troubleshooting routine tailored for use when the mobile device is not at the user equipment location does not include confirming whether the problem with the user equipment is resolved, and where the second troubleshooting routine tailored for use when the mobile device is at the user equipment location includes confirming whether the problem with the user equipment is resolved.

20. The method of claim 18, where the first troubleshooting routine tailored for use when the mobile device is not at the user equipment location does not include an action at the user equipment location to be performed by a user, and where the second troubleshooting routine tailored for use when the mobile device is at the user equipment location includes the action at the user equipment location to be performed by the user.

* * * * *